Jan. 27, 1942.         W. BINNS              2,271,058
          METHOD OF MAKING RUBBER CUSHION MATERIAL
                    Filed Sept. 27, 1938
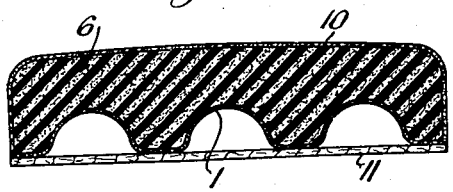
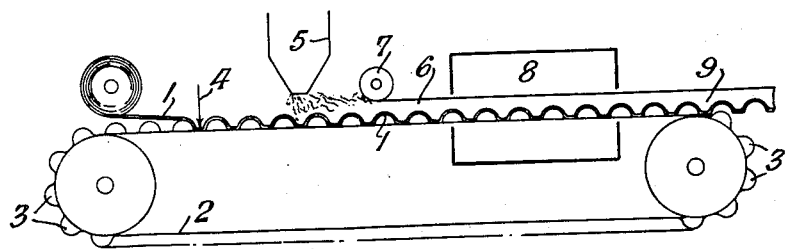
Inventor:
William Binns;
By his attorneys,
Baldwin & Wight Patented Jan. 27, 1942

2,271,058

UNITED STATES PATENT OFFICE 2,271,058

METHOD OF MAKING RUBBER CUSHION MATERIAL

William Binns, Bradford, England, assignor of one-half to Bintex, Limited, Leeds, Yorkshire, England, a company of Great Britain Application September 27, 1938, Serial No. 231,974
In Great Britain September 28, 1937

2 Claims. (Cl. 18—59)

This invention relates to improvements in rubber cushioning material.

According to the present invention a rubber cushioning material comprises a body of porous or microporous rubber shaped or formed at its back to provide a plurality of channels or the like forming air pockets, and a flexible backing secured to the rubber and conforming to the shape of the channels or the like.

The rubber is preferably formed from a latex foam or cream and moulded directly on the backing, the manufacture of the cushioning material being preferably continuous.

The invention is illustrated in the accompanying drawing in which Figure 1 is a sectional elevation of a preferred form of cushioning material, and Figure 2 a diagrammatic view of apparatus for producing the cushioning material.

Referring to the drawing the cushioning material is produced by a continuous process by unwinding a web 1 of textile fabric on to a continuous belt support 2 on the surface of which are provided a series of curved projections 3. A device of any suitable kind is provided at 4 to press the web 1 into the spaces between the projections, the device being driven synchronously with the movement of the belt. The belt with the web thus positioned passes under a hopper or the like 5 from which an incoagulated latex foam 6 pours on to the fabric, and then under a fixed roll 7, scraper or like member which smoothes off the top surface of the latex to leave a layer of the required depth on the fabric. Thereafter the belt passes through a heating chamber 8 where the latex is vulcanised and coagulated, and finally the coated fabric is removed at 9 from the belt and rolled up or otherwise stacked until required for use.

When the cushioning material is employed for squabs for chairs and the like, suitable pieces of the material are taken, comprising as shown in Figure 1 the sponge rubber body 6 backed with the fabric 1, and are secured as by adhesive to rigid backings 11 of plywood or other suitable material and the upper surface covered with fabric 10 or with a thin solid rubber facing, preferably secured by adhesive to the rubber body 6.

If desired cellular cushioning material may be made by securing two portions of similar cushioning material, comprising the backing 1 and sponge rubber 6, back to back.

It is possible by reason of the support provided by the backing to employ an extremely light sponge or foam—e. g. a 16–20 volume latex sponge—produced in any known manner, with the consequence that the material is very considerably lighter and cheaper than known cushioning material composed solely of a rubber latex sponge.

What I claim is:

1. Process for the manufacture of rubber cushioning material which comprises applying a textile web to a moving conveyor band with a corrugated surface, pressing said textile web into the corrugations of said surface whereby the textile web is correspondingly corrugated, applying a latex foam to said textile web while it is on the band in a quantity more than sufficient to fill the corrugations of said textile web, passing the coated web under a member which levels the upper surface of the latex foam, and then passing said coated textile while it is still on the band and corrugated through a heated chamber to coagulate the latex foam.

2. Process as claimed in claim 1, and in which the latex foam is produced from a vulcanisable mix and is vulcanised in the heated coagulation chamber.

WILLIAM BINNS.